United States Patent [19]

Perfetti et al.

[11] Patent Number: 4,698,223

[45] Date of Patent: Oct. 6, 1987

[54] NO-CALORIE, NON-CARIOGENIC CHEWING GUM COMPOSITION

[75] Inventors: Giorgio Perfetti; Giuseppe Sozzi, both of Lainate, Italy

[73] Assignee: Gum Base Co., S.p.A., Italy

[21] Appl. No.: 671,839

[22] Filed: Nov. 15, 1984

[30] Foreign Application Priority Data

May 29, 1984 [IT] Italy .................... 21143 A/84

[51] Int. Cl.$^4$ .............................................. A23G 3/30
[52] U.S. Cl. ............................................. 426/4; 426/6
[58] Field of Search ............................................. 426/3-6

[56] References Cited

U.S. PATENT DOCUMENTS

| 3,984,574 | 10/1976 | Comollo | 426/4 |
| 4,241,091 | 12/1980 | Stroz et al. | 426/4 |
| 4,352,822 | 10/1982 | Cherukuri et al. | 426/4 |
| 4,357,354 | 11/1982 | Kehoe et al. | 426/3 |
| 4,357,355 | 11/1982 | Koch et al. | 426/4 |
| 4,387,108 | 6/1983 | Koch et al. | 426/4 |
| 4,490,395 | 12/1984 | Cherukuri et al. | 426/3 |

FOREIGN PATENT DOCUMENTS 0019014 2/1980 Japan .................... 426/4

Primary Examiner—Jeanette Hunter
Attorney, Agent, or Firm—Sughrue, Mion, Zinn, Macpeak, and Seas

[57] ABSTRACT

A chewing gum composition comprises up to 99% by weight of a completely sugar-free base gum. Such a chewing gum is calorie-free and non-cariogenic. Futhermore it has been found to be substantially non-adhesive to the teeth, particularly to dental prostheses. The gum also contains up to 3% flavorings and up to 4% glycerol.

10 Claims, No Drawings

NO-CALORIE, NON-CARIOGENIC CHEWING GUM COMPOSITION

DESCRIPTION

The present invention relates to a no-calorie, non-cariogenic chewing gum which does not adhere to the teeth, particularly to dental prostheses.

Conventionally a chewing gum is constituted by a base gum, a sugar matrix and flavoring.

A base gum, which essentially acts as a carrier for the flavouring, is in most cases formulated in dependence on the characteristics of a desired, predetermined sugar matrix, account always being taken of the fact that, once mixed with the various sugars, sugar syrups, glycerol and flavorings, the resulting chewing gum must be soft to chew and have as linear a mastication property as possible. By linear mastication is meant that consistency characteristic of the final chewing gum whereby the mastication force is constant or substantially constant in time. Furthermore, a base gum must necessarily be insoluble in water.

For the said reasons it is well known that a base gum always has a complex formulation and, from an analytical point of view, the components thereof are known only in broad outline. In talking of base gum compositions it would be more appropriate to define them by: recipes of ingredients and those ingredients which should be chosen from those which are allowable by established standards and regulations, which generally differ from country to country.

A base gum is generally in the form of a rather stiff, solid substance the characteristics whereof may, to some extent, be indicated by its degree of penetration, measured, for example, in accordance with the ASTM D 1321 standards, and by its softening point. The base gums used until now to make chewing gums generally have a degree of penetration between 10 and 25 (measured in accordance with the standards mentioned above) and a softening point between 70° and 82° C.

The sugar matrix and the flavoring ingredients, in addition to providing their intrinsic characteristics, are particularly important for their known plasticising effect on the base gum. The chewability of the finished product (chewing gum) is thus due basically to the sugar matrix and the flavoring ingredients and consequently, an expert who formulates chewing gums should achieve the optimum balance between the quantities and qualities of the base gum, the sugar matrix and the flavoring ingredients used, in order to prolong the said characteristic of linear masticability.

In the present state of the art, the constant and basic teaching is that it is essential to use a sugar matrix and flavorings to plasticise a corresponding base gum in chewing gum formulations: the base gum generally comprises no more than 25 to 35% by weight of the weight of the finished product, the rest being constituted by the sugar matrix and a certain percentage of flavoring.

The calories and the energy-giving and cariogenic properties of chewing gums are at present attributed to the sugar matrix.

The suggestion for replacing sugars by substitute no-calorie sweeteners have resulted, on the one hand, in a reduction in the plasticity of the chewing gum and, on the other hand, in a reduction in the time for which the plasticity lasts. The consequent economic harm to chewing gum manufacturers is clear in that, in some cases, they would have to withdraw the unsold product a short time after it had been put on sale since the product would become brittle and no longer chewable.

The use of specific plasticisers, in countries in which this is allowed, has not in any case overcome the disadvantage definitively since the duration of the optimum masticability characteristic of a chewing gum, including either a sugar matrix or other sweeteners, such as sorbitol, is due essentially to the degree of crystallisation of the sugar (or of the sorbitol) and the moisture loss.

A further disadvantage due to the presence of substitute sweeteners for the sugars lies in the known difficulty of metering these substitutes and hence the difficulty in obtaining a finished product with satisfactory organoleptic qualities.

The problem at the root of the present invention is that of providing a chewing gum which is both non-cariogenic and calorie-free and the composition whereof overcomes the disadvantages of the prior art explained above.

This problem is solved according to the present invention by a chewing gum which does not have a sugar matrix and which comprises, in percentages by weight:

from 8 to 15% of an elastomer selected from the group comprising polyisobutylenes and isobutylene-isoprene copolymers, from 10 to 30% of hydrogenated or partially-hydrogenated animal or vegetable oils, from 10 to 39% of inert mineral fillers, from 8 to 25% of polyvinyl acetate with a degree of polymerisation of from 100 to 4000, from 4 to 9% of fatty acid mono- and di-glycerides, from 15 to 25% of resin, from 2 to 6% of natural gum, from 4 to 12% of wax and up to 0.5% of antioxidants.

The preferred elastomers for the composition of a base gum of the invention comprise a suitable mixture of polyisobutylene with a molecular weight of between 6000 and 15,000, polyisobutylene with a molecular weight of between 6000 and 15,000 and an isobutylene-isoprene copolymer. Preferably the elastomer used for the base gum of the invention is a mixture comprising 30% by weight of isobutylene-isoprene and 70% by weight of polyisobutylene with a molecular weight of 6000–15,000.

The resins used in the base gum composition of the invention are chosen from the group comprising glycerol esters of colophony rosin, glycerol esters of polymerised colophony rosin, glycerol esters of hydrogenated colophony rosin and methyl esters of partially-hydrogenated colophony rosin.

The natural gum preferably used in the base gum composition of the invention is the so-called chicle gum.

In addition to the desired characteristics of being caloric-free and non-cariogenic, a chewing gum having the said composition does not adhere to the teeth, particularly to dental prostheses.

In accordance with a further characteristic of the invention, the chewing gum composition includes up to 1.5% of a sweetener of the aspartame type.

Further characteristics and advantages achieved by the invention will become apparent from the following description of several examples of chewing gum formulations according to the invention, in which all the percentages are given by weight if not otherwise indicated.

Conventional methods and equally conventional apparatus were used to prepare a base gum from the following recipe:

| | |
|---|---|
| elastomer | 10.33% |
| vegetable oil | 20.41% |
| mineral filler (talc) | 21% |
| polyvinyl acetate | 16.5% |
| mono-, di-glycerides of fatty acids | 5.94% |
| resin | 16.54% |
| natural chicle-type gum | 5% |
| microcrystalline wax | 4.23% |
| antioxidants | 0.05% |

The elastomer used in the recipe was a mixture of 30% of an isobutylene-isoprene copolymer and 70% of polyisobutylene with a molecular weight of between 6000 and 15,000.

The vegetable oil used in the recipe comprised 36% by weight of cottonseed oil and 64% of palm oil.

The resin used in the composition comprised 54% glycerol esters of hydrogenated colophony rosin, 15% glycerol esters of polymerised colophony rosin and 31% methyl esters of partially-hydrogenated colophony rosin.

This base gum had a softening point of 56° C. and a degree of penetration of 32 measured in accordance with the ASTM D 1321 Standards.

Chewing gum was made from this base gum, in the form of small sheets with the formulations given in the following table.

| EXAMPLE | BASE GUM | GLYCERINE | SWEETENER (Aspartame) | FLAVORING | |
|---|---|---|---|---|---|
| 1 | 99% | — | — | | 1% |
| 2 | 97% | — | — | oil | 1.5% |
| | | | | powder | 1.5% |
| 3 | 96.8% | — | 0.8% | | 2.4% |
| 4 | 92.8% | 4% | 0.8% | oil | 1.2% |
| | | | | powder | 1.2% |
| 5 | 92.8% | 3.2% | 1.6% | | 2.4% |
| 6 | 98% | — | 0.8% | | 1.2% |

The quality of a chewing gum is, for the most part, evaluated on the basis of an experimental masticability test and a plasticity test. The masticability test results in an average value from among a series of subjective evaluations of the consistency of the gum sheet carried out by direct chewing, for a predetermined time, by a corresponding series of operators. The plasticity test is carried out by establishing the number of bends through 90° and subsequent straightenings which the sheet can withstand before it starts to crack. This test is generally carried out at a substantially constant temperature with reference to 10 bends as the plasticity evaluation index. In chewing gums at present available on the market, it has been found that the results of the plasticity tests are strictly correlated with the water contents of the chewing gum sheets. In this respect, it has been found that sheets with a moisture content of 3% have the optimum plasticity. When the moisture content falls to 2% (either by evaporation or by crystallisation) the sheet does not withstand more than six or seven bends and as such is judged brittle and not commercially acceptable.

Sheets of chewing gums according to the invention and of a sample chewing gum at present available commercially were subjected to the conventional masticability and plasticity tests. The sample chewing gum had the following standard formulation;

| | |
|---|---|
| conventional base gum | 20% |
| glucose syrup, 45 Banume degrees | 19% |
| powdered sugar | 60% |
| glycerol (emollient) | 0.5% |
| flavorings | 0.5% |

The sample chewing gum had a water content of 3%. The tests carried out on the sheets of chewing gum "immediately after production", or freshly produced, gave results which were entirely comparable with regard to their consistency (masticability test) and their linear mastication, in the sense of uniformity of the mastication force. They also had more than satisfactory characteristics of plasticity in that the sample chewing gum started to crack after 32 bends while the chewing gum of the invention showed no sign of cracking after 40 bends.

All the sheet chewing gums were then subjected to an accelerated ageing process in a climatised chamber kept at a temperature of 40° C. and a relative humidity of 35% to 40%. The stay time in the climatised chamber was 72 hours, corresponding to a period of storage under normal ambient conditions (average Italian climate) of 1 year.

The sample sheet started to crack after only 6 bends and was initially unacceptable in the masticability test. In fact it broke initially into several pieces; only as mastication continued and moisture was absorbed from the oral cavity (salivation) did it partially re-acquire its initial plasticity and consistency.

The chewing gum sheets of the invention, on the contrary, had the same consistency and the same high plasticity as in the previous tests.

We claim:

1. A non-cariogenic, no-calorie chewing gum composition, including, in percentages by weight, from 92% to 99% of a base gum, up to 3% of flavorings and up to 4% of glycerol, and wherein the base gum is sugarfree and comprises, in percentages by weight:
   from 8 to 15% of an elastomer selected from the group consisting of polyisobutylenes and isobutylene-isoprene copolymers,
   from 10 to 30% of hydrogenated or partially-hydrogenated animal or vegetable oils,
   from 10 to 39% of inert mineral fillers,
   from 8 to 25% of polyvinyl acetate with a degree of polymerization of from 100 to 400,
   from 4 to 9% of fatty acid mono- and di-glycerides,
   from 15 to 25% of resins,
   from 2 to 6% of natural gum,
   from 4 to 12% of wax and
   up to 0.05% of antioxidants.

2. A composition as defined in claim 1, wherein the said elastomer in the base gum comprises 30% by weight of isobutylene-isoprene and 70% by weight of polyisobutylene with a molecular weight of between 6000 and 15000.

3. A composition as defined in claim 1, wherein the said resins in the base gum comprise one or more members selected from the group consisting of glycerol esters of colophony rosin, glycerol esters of polymerized colophony rosin, glycerol esters of hydrogenated colophony rosin, and methyl esters of partially-hydrogenated colophony rosin.

4. A composition as defined in claim 1, including up to 1.5% by weight of a sweetener of the aspartame type.

5. A composition as defined in claim 1, wherein the base gum comprises, in percentages by weight:

| | |
|---|---|
| elastomer | 10.35% |
| vegetable oil | 20.41% |
| mineral filler (talc) | 21% |
| polyvinyl acetate | 16.5% |
| mono-, di-glycerides of fatty acids | 5.94% |
| resins | 16.54% |
| natural gum | 5% |
| microcrystalline wax | 4.23% |
| antioxidants | 9.05%. |

6. A composition as defined in claim 5, wherein the vegetable oil comprises a mixture of cottonseed oil and palm oil.

7. A composition as defined in claim 6, wherein the mixture comprises 36% by weight of cottonseed oil and 64% by weight of palm oil.

8. A composition as defined in claim 5, wherein the resins in the base gum comprise one or more members selected from the group consisting of glycerol esters of colophony rosin, glycerol esters of hydrogenated colophony rosin, glycerol esters of polymerized colophon rosin and methyl esters of partially-hydrogenated colophony rosin.

9. A composition as defined in claim 8, wherein the base gum comprises a mixture of glycerol esters of hydrogenated colophony rosin, glycerol esters of polymerized colophony rosin and methyl esters of partially-hydrogenated colophony rosin.

10. A composition as defined in claim 9, wherein the resin mixture comprises, in percentages by weight:

| | |
|---|---|
| glycerol esters of hydrogenated colophony rosin | 54% |
| glycerol esters of polymerized colophony rosin | 15% |
| methyl esters of partially-hydrogenated colophony rosin | 31%. |

* * * * *